United States Patent [19]

Stewart

[11] 3,764,825

[45] Oct. 9, 1973

[54] ACTIVE ELEMENT MEMORY

[76] Inventor: Richard F. Stewart, 13027 Sky Valley Rd., Los Angeles, Calif. 90049

[22] Filed: Jan. 10, 1972

[21] Appl. No.: 216,511

[52] U.S. Cl. .................. 307/238, 307/291, 307/296, 340/173 FF

[51] Int. Cl.. H03k 17/22, H03k 3/286, G11c 11/40

[58] Field of Search .................... 307/238, 279, 289, 307/291, 296, 303, 299; 340/173 FF, 173 AM

[56] References Cited

UNITED STATES PATENTS

| | | | |
|---|---|---|---|
| 3,660,827 | 5/1972 | Tickle | 307/238 X |
| 3,636,530 | 1/1972 | Mark et al. | 307/238 X |
| 3,618,052 | 11/1971 | Kwei | 307/291 X |
| 3,423,737 | 1/1969 | Harper | 307/291 X |
| 3,573,758 | 4/1971 | Henle | 307/238 X |
| 3,309,534 | 3/1967 | Yu et al. | 340/173 FF |
| 3,354,440 | 11/1967 | Farber et al. | 307/238 X |
| 3,427,598 | 2/1969 | Kubinec | 307/238 X |
| 3,492,661 | 1/1970 | Pricer | 307/238 X |
| 3,531,778 | 9/1970 | Gardner et al. | 307/238 X |
| 3,550,097 | 12/1970 | Reed | 307/238 X |
| 3,573,499 | 4/1971 | Lynes | 307/238 |
| 3,588,844 | 6/1971 | Christensen | 307/238 X |
| 3,651,492 | 3/1972 | Lockwood | 307/238 X |

OTHER PUBLICATIONS

Berding, "Simultaneous Read–Write Monolithic Storage Cell," IBM Tech. Discl. Bull.; Vol. 13, No. 3, p. 620, 8/1970.

Trinko, "Memory Cell," IBM Tech. Discl. Bull.; Vol. 14, No. 6, p. 1664–1665, 11/1971.

Klepp et al., "Regenerative Controlled Decay Storage Cell," Vol. 14, No. 1, p. 270, 6/1971.

*Primary Examiner*—John W. Huckert
*Assistant Examiner*—L. N. Anagnos
*Attorney*—Lewis M. Dalgarn

[57] ABSTRACT

Bistable memory elements having a pair of active transistor components are provided with separate voltage supply lines. The collector and/or emitter circuits of each transistor pair are selectively connected to different ones of the voltage supply lines, which are actuated in sequence to set each memory element into a predetermined initial state, thus combining the advantages of read-only operation with random access capabilities.

7 Claims, 4 Drawing Figures

PATENTED OCT 9 1973 3,764,825

ACTIVE ELEMENT MEMORY

BACKGROUND OF THE INVENTION

This invention relates to bistable memory elements and, more specifically, to those having both read only memory and random access memory capabilities, sometimes referred to as "latent image memories".

Random access memories typically comprise two active elements that are alternatively set in either one of two conductive conditions according to the information stored in the memory element. In random access memories of the bistable multivibrator or flip-flop type, the active elements typically are a pair of transistors or similar components, each having its collector circuit connected to a suitable operating voltage supply line. In such devices, when operating voltage is applied, one of the transistors conducts current, thus being turned "on", while the other transistor does not conduct current, thus being turned "off". The particular conductive state of the flip-flop may be detected or sensed and the flip-flop remains in that conductive state until an input pulse signal is applied to change its state.

Generally, the conductive state of the flip-flop is changed by one of two methods. First, an input pulse may be supplied to a common input terminal to both emitters causing the previously conducting transistor to stop conducting, or shut off, and the previously nonconducting transistor to begin conducting, or turn on, thus reversing the conductive state of the flip-flop. Alternatively, the conductive state of the flip-flop may be selected by applying an input signal to only one transistor causing it to begin or stop conducting, thus switching the flip-flop to its other conductive state, where it remains until the other transistor receives an input signal or operating power is lost.

Such conventional flip-flop elements have limitations when used in large scale computer memories. The initial conductive condition of each flip-flop must be separately set or reset to store a given initial set of information in the memory array. An index, listing or compilation of the initial values must either be internally developed or serially transferred from a permanent storage such as a card stack, a magnetic tape, data disc or the like. If the information in a random access computer memory is somehow erased or lost, such as by a momentary power failure or "crash" resulting from a minor softward error or unexpected transients, the entire set of initial bit values must then be reloaded into the memory. This can require a substantial amount of time, even if the permanent card, disc or tape is immediately available. However, until the memory is reloaded, the computer is useless, and on large scale fixed installations, this can mean the loss of a substantial amount of extremely valuable computer time. With airborne navigation computers and other remote systems, initial information cannot be permanently stored for quick reloading, and the entire system can be rendered inoperative until a source for the initial data can be reached.

On the other hand, although read only memories are capable of permanently storing information, the contents cannot be altered or modified once entered without changing the memory array structure. Thus, both types of memories are commonly employed in the same computer system to give both capabilities. Generally, the read only memory would be used for permanent data such as basic instructions and repetitive routines, while the random access memory performs a "scratch pad" function for temporary storage of variable data.

Attempts have been made recently to provide active memory arrays with combined random access and read only capabilities so that, if the stored information were accidentally lost or erased in error, each element could be reset to an initial condition to restore the correct basic data within an extremely short period of time. Such arrays have been termed "latent image memories."

In addition, the latent image capability would permit instantaneous entry of data for repetitive fixed routines, such as periodic tests, into portions of the random access memory, thus avoiding the need for separate storage for each such routine or for wasting valuable computer time while this data is inserted from permanent disc or tape storage. Moreover, if different latent images can be selected, selected sets of basic instructions could be quickly interchanged to suit each type of operation performed with the same machine, as is common in time sharing applications, instead of having to separately store or enter each different program.

However, the circuit designs proposed for latent image memories have been either too complicated or too costly for practical use, particularly for large scale integrated circuit arrays. Specifically, these proposed designs either incorporate additional capacitive or diode elements on one side or the other of the bistable flip-flop, or involve a deliberate unbalancing or asymetry between the circuit components on opposite sides. In these designs, the additional components or assymetrical elements must be formed during initial fabrication of the circuit array so that the information present in the latent image cannot later by readily changed or altered. Thus, in an integrated circuit array including a multitude of memory cells on a single chip, the latent image information is predetermined by the initial mask or pattern layouts, thus making these designs economically feasible only where numerous large scale integrated memories all containing the same basic information are needed. On the other hand, widespread application of the latent image concept, particularly in large scale integrated arrays, requires a circuit arrangement that can be mass produced in such a form that the desired latent image information can be entered by relatively quick and simple operations to suit the particular user's application, yet without requiring any significant additional chip area or laborious effort in making special connections or adding components.

SUMMARY OF THE INVENTION

The present invention provides latent image capability for memory arrays with substantially conventional balanced bistable memory elements or cells consisting of a pair of cross-coupled active solid state components, such as transistors. Means are provided in fabricating the array for selectively coupling the active solid state component on either side of the memory element to alternate ones of two separate voltage supply lines, to which the required operating voltages are then initially applied in a predetermined sequence to set each memory element into a desired initial state. Afterwards, the two supply lines are operated as one, being maintained at the same voltage for normal random access operation.

In bistable elements employing transistor components or the like, the collector or emitter, or in some cases both, are alternatively connected to different ones of a pair of operating voltage supply lines so that, after the required operating voltage is applied to one and then the other of these lines, the transistor on the selected side is placed in the conducting state indicative of the desired binary bit value. To accomplish this, it is merely necessary to divide the usual single voltage supply line into two different lines and provide some means of connecting the bistable elements to either one or the other of these divided lines. This is preferably accomplished in integrated circuit arrays by providing a surface metal connection from an underlying connecting point of each memory component to each of the two surface metal voltage supply lines, and then removing one of the connecting portions leaving the other in place. Without removal of one of the connecting portions, the array operates as a conventional random access memory, which permits the array operation to be tested prior to entering the latent image.

DESCRIPTION OF THE SEVERAL VIEWS OF THE DRAWING

Many other features of this invention will become apparent to those skilled in the art upon reading the following detailed description when taken in conjunction with the figures of the drawing wherein.

DETAILED DESCRIPTION

Although the illustrated form of this invention to be described and illustrated relates to solid state bistable circuits with transistor flip-flop elements, other types of multivibrator arrangements may be similarly utilized in practicing the invention. Also, while such arrangements are particularly useful for memory arrays, the invention may be advantageously employed to preset the contents of each stage in a serial shift register, binary counter or the like, as will be apparent.

Figure 1:
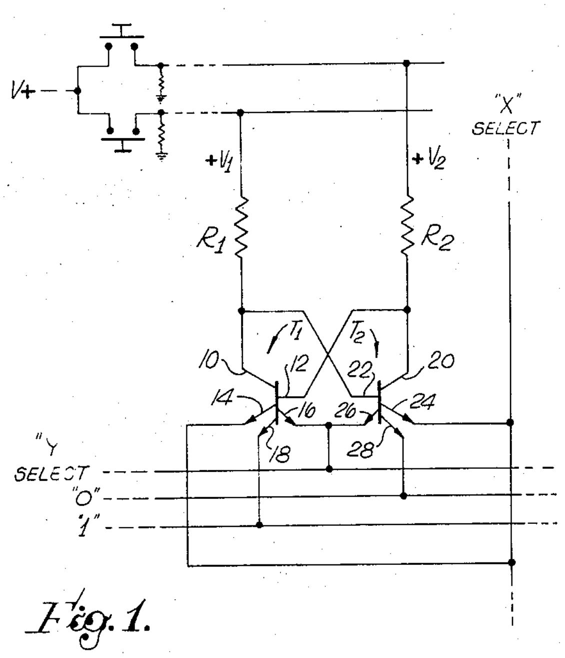
FIG. 1 is a schematic circuit diagram of a preferred form of a bistable memory cell in accordance with the invention.

Referring now to FIG. 1, each element or cell of a random access memory array generally consists of a solid state bistable flip-flop circuit having a pair of cross coupled transistors T1 and T2. The base 12 of transistor T1 is conventionally cross coupled with the collector 20 of transistor T2 and the T2 base 22 connected to the T1 collector 10. A first pair of emitters 14 and 24 for the transisors T1 and T2 respectively receive vertical column selection inputs from the X-line of the memory grid while emitters 16 and 26 of transistors T1 and T2 receive the horizontal row selection inputs from the Y-line of the memory grid. A second emitter 18 of transistor T1 receives the "1" (set) line input of the memory grid while emitter 28 of transistor T2 receives the "0" (reset) line input. All of the X, Y, "1" and "0" lines are normally maintained at or near ground potential. Operating voltage from voltage supply line V1 is applied to collector 10 of transistor T1 through load resistor R1 while operating voltage from voltage supply line V2 is applied to collector 20 of transistor T2 hrough load resiscor R2.

In accordance with the present invention, the collectors 10 and 20 of transistors T1 and T2 are each selectively coupled to a separate one of two voltage supply lines V1 and V2, respectively. The separate voltage supply lines V1 and V2 can be activated in sequence, one after the other, in the illustrated circuit embodiments to supply a V+ operating voltage level from an appropriate source of sources to set a preselected one of the NPN transistors in the conducting state. For example, in the embodiment illustrated in FIG. 1, the supply line V1 would be actuated to apply a V+ operating voltage before the supply line V2, after which both lines V1 and V2 are left at the same V+ potential for normal operation. For this purpose, a "set" button and a "run" button can be provided on the computer console. Pushing the "set" button closes a first microswitch to connect the line V1 to the V+ source and pushing the "run" button closes a second microswitch to connect line V2 to the V+ source.

When the V+ operating voltage is applied first to line V1 and then to line V2, the final result is that transistor T2 will be "turned on" to conduct while transistor T1 is "turned off" and does not conduct. On the other hand, if this sequence were reversed, the opposite conducting state would result with T1 "on" and T2 "off". Of course, with PNP transistors, a V− voltage is used.

In operation, the entire flip-flop is initially turned off with both the V1 and V2 supply lines and the emitter terminals at ground potential. When the set button is pushed, the voltage supply line V1 applies the V+ operating voltage through the load resistor R1 to the collector 10 of transistor T1 and also the base 22 of transistor T2. However, neither transistor conducts, since the base 12 of transistor T1 and the collector 20 of T2 are held at ground potential in accordance with V2. However, when the run button is pushed to apply the V+ operating potential to the voltage supply line V2, T2 begins conducting because of the existing high base to emitter forward bias. The flow of current through R2 results in a voltage drop holding down the base potential of T1. Thus, no current flows through transistor T1, which is cut off to maintain the elevated potential near V+ on the base of transistor T2 holding it in conduction, as with conventional flip-flop arrangements. To change the state of the flip thereafter, a positive going pulse applied to each of the multiple emitters 24, 26 and 28 of transistor T2 turns it off, thus raising the potential at the T1 base 12 to provide the forward base to emitter bias for turning the transistor T1 on to begin conducting, after which the emitters are returned to ground or common potential.

The state of the bistable is indicated by the presence of the V+ potential at the respective collector terminal 10 or 20. For example, a binary "0" is stored when the positive voltage at the T1 collector 10 is near V+ with transistor T2 conducting, and a binary "1" is stored when the voltage present at the T2 collector 20 is near V+ with transistor T1 conducting. The binary value of each cell can thus be sensed by sensing the collector voltages. However, in such multiple emitter arrays, readout is typically accomplished by applying positive going "X" and "Y" select pulses simultaneously to the emitters 14, 16, 24 and 26. This transfers most or all of the current flowing through the conducting transistor T1 or T2 to the remaining emitter 18 or 28, thus producing an output signal on the respective "1" or "0" line, which is otherwise held at a potential slightly above that normally maintained on the "X" and "Y" select lines. After full actuation with V1 and V2 both at V+ potential, the flip-flop circuit of FIG. 1 operates as a random access active memory element in that its conductive state may be changed at will by applying pulses to the emitters of one or the other of the transistors, as described above.

Figure 2:
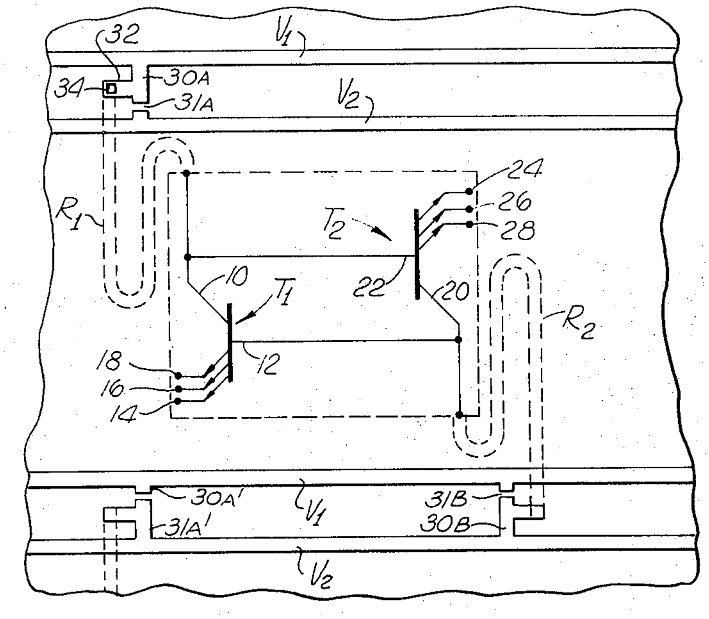
FIG. 2 is a partial schematic diagram which depicts connection of the bistable memory cell circuits of FIG. 1 on a portion of one surface of a chip containing a large scale integrated circuit array.
Figure 3:
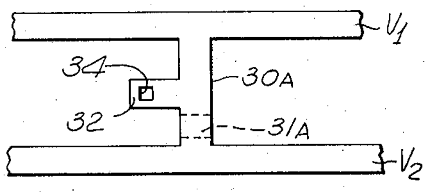
FIG. 3 is an enlarged view of a portion of the chip surface shown in FIG. 2 showing one means for permitting the selective connection of the bistable elements in accordance with the invention.

Referring now to FIG. 2, the alternative V1 and V2 connections for the flip-flop of FIG. 1 are readily accommodated in typical memory grid layout for large scale integrated circuit arrangements. The load resistors R1 and R2, shown by the dashed lines as serpentine strips, are formed in a subsurface epitaxial layer a few microns thick using known diffusion techniques. Ohmic contact is made at one end of each load resistor R1 and R2 with a surface metallization layer laid in strips by vacuum deposition through a mask or by etching. Initially, the metal strips connect both voltage supply lines V1 and V2 to the ends of the load resistors R1 and R2, as best shown in the enlarged view of FIG. 3. The voltage supply lines V1 and V2, which generally extend in straight lines past each row of memory cells on an LSI chip, are initially formed with narrow cross strips 30 each having a narrow protruding tongue portion 32 at its center that extends to make contact with the terminal region 34 at one end of the load resistor R1. The load resistor R1 is selectively coupled to only a selected one of the lines V1 or V2 simply by removing one portion 31A of the cross strip 30 between the tongue 32 and one of the voltage lines V1 or V2, as shown by the dashed lines, with etching, laser evaporation or the like, to leave an electrically insulating gap. Alternatively the selective connection to either V1 or V2 lines may be made by initially providing neither connection and then making the desired connection from the tongue portion by deposition or metallization techniques, or from the terminal region 34 by ion beam implantation.

Memory arrays in accordance with this invention can thus be constructed with only a small additional surface area being required to accommodate the additional voltage supply line between each row of flip-flops, all at a very low additional cost. Moreover, the basic bistable operation of each cell can be tested as a conventional random access memory prior to selecting the latent image information to be entered. Such an active element provides both read only and random access memory capabilities at great savings in cost and space, while also having various operational advantages over present systems using both types of memories.

Figure 4:
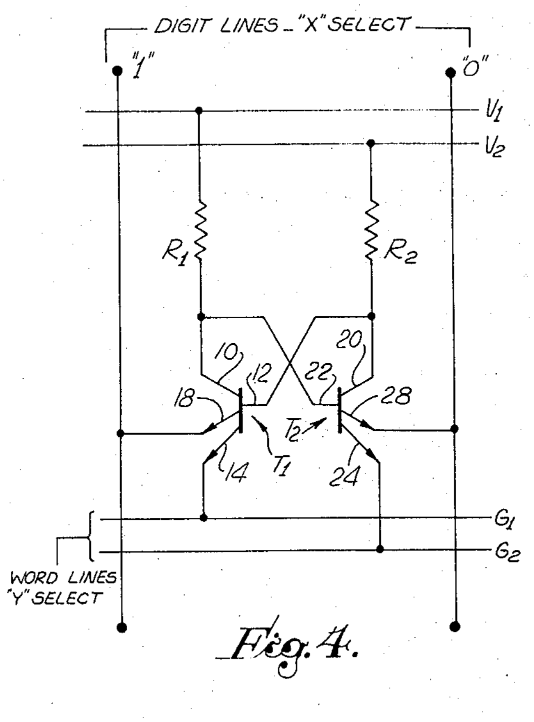
FIG. 4 is a schematic circuit diagram showing an alternative form of the invention.

Referring now to FIG. 4, a basic bipolar memory cell using cross coupled multiple emitter transistors, similar to those shown in FIGS. 1 and 2, provides a dual latent image capability. In FIG. 4, like numbers and letter designations indicate corresponding elements and connections.

With the emitter coupled cell, as shown in FIG. 4, the need for a separate "X" select line in the array is eliminated. Instead, separately driven "1" and "0" digit lines are used to perform this function, thus conserving chip area. Also, the emitter coupled cell permits readout on the "1" or "0" digit lines, as determined by the state of the cell. As a result, only two emitters on each transistor T1 and T2 are needed for this cell configuration. Of course, such arrangements require appropriate switching and gating circuits for performance of the combined address and readout functions on these digit lines.

During normal operation of the emitter coupled cell shown in FIG. 4, a V+ operating potential is applied to the load resistors R1 and R2 at the respective collector terminals 10 and 20 of the transistors T1 and T2, while a ground or common potential is applied to the emitters 14 and 24, respectively, over the word lines (or "Y" select lines) G1 and G2. At the same time, the digit lines (or "X" select lines) are maintained at a slightly more positive potential, such as 0.3 volts, to minimize current flow through the emitter 18 or 28, respectively, during normal storage. When operating as an active memory element, the bistable cell is switched to a particular state by applying a positive going voltage pulse signal to its address lines G1 and G2 and also to either its "1" or its "0" digit line in accordance with the binary value to be stored at that particular memory position. Assuming the bistable was initially in the "0" state with the transistor T1 conducting, the positive going voltage pulse on the word lines G1 and G2 and on the "1" digit line would block further conduction through its emitters 14 and 18, thus raising the potential at its collector 10 and at the base 22 of T2 causing it to begin conduction through its emitter 28, which remains near ground potential. With T2 conducting, the potential at the T2 collector 20 drops because of the voltage drop across R2, so that when the positive voltage of the address pulses on the word lines and the "1" digit line is removed, the low potential on the T1 base 12 maintains that transistor cut off and the T2 transistor conducting. On the other hand, if the bistable were already in the "1" state with the transistor T2 conducting when the aforementioned address signals were applied to the emitters 14 and 18 of the non-conducting transistor T1, the cell would simply remain in that state.

In such an array, readout from the particular cell is accomplished by applying a positive going address pulse to both word lines G1 and G2 while activating a sensing circuit coupled to the "1" and "0" digit lines of that cell. As previously explained in connection with the operation of the circuit of FIG. 1, positive going address signals applied to the emitters 14 and 24 transfer the current flow of whichever transistor T1 or T2 is conducting to its remaining emitter 18 or 28 to be sensed by the readout circuitry on the respective "1" or "0" digit line. The advantage of this configuration is that two independent latent image conditions are built into the flip-flop shown in FIG. 4. For example, it may be desired to run two different types of programs on the same computer, such as a chemical process control and a business accounting operation. With these dual image memory cells, a memory array can contain the initial conditions or program instructions required for two entirely different applications that can be quickly interchanged almost instantaneously.

Chart A shows the choice of initial "set" conditions for the voltage supply lines V1 and V2 and the word lines G1 and G2, along with the corresponding transistor that is left conducting when normal "run" conditions with the two voltage lines V1 and V2 both at +V and the two word lines G1 and G2 at ground or common potential.

CHART A

| | CONDUCTIVE TRANSISTOR | V1 | V2 | G1 | G2 |
|---|---|---|---|---|---|
| ROW 1 | T2 | +V | 0 | 0 | 0 |
| ROW 2 | T1 | 0 | +V | 0 | 0 |
| ROW 3 | T2 | +V | +V | +V | 0 |
| ROW 4 | T1 | +V | +V | 0 | +V |

For example, the initial conditions represented by the data in ROW 1 of Chart A indicate that voltage supply lines V1 is first coupled to the voltage supply +V and that voltage supply line V2 and the ground lines G1 and G2 are initially grounded. In this situation, T1 collector 10 in FIG. 4 is at +V while T2 collector 20 is at ground potential. When operating V+ voltage is then later applied to the supply line V2, while the word lines G1 and G2 remaining at ground, transistor T2 conducts.

In practice, the sequence of actuating the supply lines V1 and V2, and the word lines G1 and G2 would be fixed, permitting two latent image conditions that can be chosen by selecting between a "SET A" or a "SET B" position on a console selector switch, or set automatically by a coded selector signal. For example, in the "SET A" condition, V+ voltage would be applied only to line V1 as represented in ROW 1 of Chart A. In the "SET B" only the word line G2 would be set to ground potential while the others are at V+ as shown in ROW 3. Thus, both word line G2 and supply line V1 can be permanently connected to receive normal operating potentials, while switching need only occur for the G1 and V2 lines.

Although the invention has been described for the sake of simplicity with reference to a basic form of bistable memory cell circuit employing a pair of multiple emitter transistor components as the cross coupled active elements, the invention is equally applicable to other types of equivalent bistable cells or circuits, such as MOS, CMOS and FET bistable flip-flop memory circuits.

What is claimed is:

1. An active memory cell comprising:

a circuit including a pair of active elements each having a control terminal for selectively gating current flow between first and second conduction terminals of each active element connected in series with an associated output impedance between first and second different fixed operating potentials, said first conduction terminal of each active element being coupled to one of said operating potentials through its associated output impedance and cross coupled to the control terminal of the other active element;

means coupling the second conduction terminal of both active elements to receive said second operating potential; and means for simultaneously coupling through said associated output impedances the first conduction terminal of one of said active elements to said first operating potential and the first conduction terminal of the other of said active elements to said second operating potential to establish an initial circuit state and for subsequently coupling the first conduction terminal of said other active element to said first operating potential.

2. An active memory cell as defined in claim 1 wherein:

said pair of active elements comprise a bistable multivibrator adapted to be connected to a voltage supply and said coupling means comprise first and second switches sequentially operable to couple the conduction terminals of said active elements to receive said operating potentials.

3. An active memory cell as defined in claim 2 wherein:

said active elements are transistor elements with said first and second conduction terminals being the collector and emitter terminals, respectively, and said control terminal being the base.

4. An active memory cell array comprising bistable multivibrators each including:

first and second transistor elements, each having its collector connected in series with an associated output impedance and a base terminal for selectively gating current flow between the collector and a plurality of emitters of the respective transistor when said collector in series with its associated output impedance and at least one of the emitters are connected between first and second different operating potentials of a voltage supply source to receive a forward collector to emitter bias, the collector of each transistor being cross coupled to the base of the other transistor;

means for selectively coupling the collector of one of said transistor elements through its associated output impedance to the first of said different operating potentials and at least one of the emitters to the second of said different operating potentials to provide said forward collector to emitter bias;

sequentially operable switch means for first simultaneously coupling both the collector through said impedance and the emitters of the other of said transistor elements to either of said first or second different operating potentials to establish an initial state and for subsequentially coupling either the collector or receives said first operating potential or at least one emitter of the other transistor to receive said second operating potential to change its operating potential to provide said forward collector to emitter bias.

5. A method of connecting each bistable circuit in an active memory array to first and second different operating potentials so that each said bistable circuit is driven to a predetermined one of its conducting states, wherein said circuit includes two active elements, each active element having first and second conduction terminals coupled in series with an associated output impedance, the steps of:

initially coupling the first and second conduction terminals of one of said active elements in series with its output impedance between said first and second operating potentials respectively;

simultaneously coupling both said first and second terminals of the other active element in series with its associated output impedance to either one of said first or second different operating potentials to establish an initial circuit state; and subsequently coupling either the first terminal to receive said first operating potential or said second terminal of said other active element to receive said second operating potential to change the operating potential thereon.

6. A method of connecting each bistable circuit as defined in claim 5 wherein:

said first potential is a positive potential of a voltage supply and said second potential is a ground or common potential.

7. A method of applying operating potentials from a voltage supply to set each of a plurality of bistable circuits in a desired one of its conducting states, wherein said circuits includes first and second transistor elements, each having base, collector, and emitter terminals, the collector of each transistor being cross coupled to the base of the other transistor, and connected in series with an associated output impedance the steps of:

initially coupling the collector of the first transistor through its associated output impedance to a first operating potential;

simultaneously coupling the emitters of both transistors and the collector of the second transistor through its associated output impedance to a second operating potential; and, subsequently coupling the collector of the second transistor through its associated output impedance to said first operating potential.

* * * * *